US012575707B2

(12) United States Patent
Song et al.

(10) Patent No.: US 12,575,707 B2
(45) Date of Patent: Mar. 17, 2026

(54) WET DUSTER MODULE FOR A CLEANER

(71) Applicant: LG Electronics Inc., Seoul (KR)

(72) Inventors: Byoungtack Song, Seoul (KR); Moonsoo Song, Seoul (KR)

(73) Assignee: LG Electronics Inc., Seoul (KR)

( * ) Notice: Subject to any disclaimer, the term of this patent is extended or adjusted under 35 U.S.C. 154(b) by 482 days.

(21) Appl. No.: 17/916,464

(22) PCT Filed: Mar. 30, 2021

(86) PCT No.: PCT/KR2021/003922
§ 371 (c)(1),
(2) Date: Sep. 30, 2022

(87) PCT Pub. No.: WO2021/201563
PCT Pub. Date: Oct. 7, 2021

(65) Prior Publication Data
US 2023/0147103 A1 May 11, 2023

(30) Foreign Application Priority Data
Mar. 30, 2020 (KR) ........................ 10-2020-0038162

(51) Int. Cl.
*A47L 11/40* (2006.01)
*A47L 11/30* (2006.01)
*B05B 1/26* (2006.01)

(52) U.S. Cl.
CPC ......... *A47L 11/4088* (2013.01); *A47L 11/302* (2013.01); *A47L 11/4038* (2013.01);
(Continued)

(58) Field of Classification Search
CPC .......................... A47L 11/4088; A47L 11/302; A47L 11/4038; A47L 11/4083; A47L 11/4094;
(Continued)

(56) References Cited

U.S. PATENT DOCUMENTS 5,211,335 A * 5/1993 Strid ..................... B05B 15/534 239/110
2005/0177972 A1 8/2005 Studebaker
(Continued)

FOREIGN PATENT DOCUMENTS

CN 1176152 A * 3/1998 .............. A47L 11/34
CN 203000818 6/2013
(Continued)

OTHER PUBLICATIONS

KR_20190125938_-_Translation (Year: 2019).*
(Continued)

*Primary Examiner* — Bryan R Muller
(74) *Attorney, Agent, or Firm* — Fish & Richardson P.C.

(57) ABSTRACT

Disclosed is a wet duster module for a cleaner including: a water supply nozzle for discharging water from the water tank to the duster, and the water supply nozzle includes: a nozzle body having a water outlet for discharging water to the duster at one end thereof, and as the water outlet is formed to be inclined, waterdrops forming on and blocking the water outlet may be prevented and clogging the water outlet with foreign substances contained in the waterdrops, as the formed waterdrops are dried up, may be prevented.

18 Claims, 9 Drawing Sheets

(52) U.S. Cl.
CPC ....... *A47L 11/4083* (2013.01); *A47L 11/4094* (2013.01); *B05B 1/267* (2013.01)

(58) Field of Classification Search
CPC .. A47L 11/4044; A47L 9/0472; A47L 11/408; A47L 11/201; B05B 1/267; B05B 1/28; B05B 15/50; B05B 15/52; B05B 1/04; B05B 1/042; B05B 1/044; B08B 3/024
USPC ........ 134/198; 239/601, 593, 104, 106, 110, 239/120, 597–599; 15/302, 320
See application file for complete search history.

(56) References Cited

U.S. PATENT DOCUMENTS

| | | | | |
|---|---|---|---|---|
| 2006/0288518 | A1* | 12/2006 | Lenkiwicz | A47L 11/4016 15/322 |
| 2010/0146729 | A1 | 6/2010 | Hollis | |
| 2010/0287716 | A1* | 11/2010 | Kasper | A47L 11/4088 15/4 |
| 2014/0014139 | A1* | 1/2014 | Landmer | B05B 7/0433 134/198 |
| 2017/0245721 | A1 | 8/2017 | Rudolph | |

FOREIGN PATENT DOCUMENTS

| | | | | |
|---|---|---|---|---|
| CN | 103356133 | | 10/2013 | |
| CN | 204148032 | | 2/2015 | |
| CN | 113440065 | A * | 9/2021 | A47L 11/282 |
| GB | 734864 | | 8/1955 | |
| JP | 4005043 | | 11/2007 | |
| JP | 4005043 | B2 * | 11/2007 | A47L 9/06 |
| KR | 10-1999-0030912 | | 5/1999 | |
| KR | 20070021763 | | 2/2007 | |
| KR | 1020190125938 | A * | 4/2019 | A47L 11/20 |
| KR | 10-20190125938 | | 11/2019 | |
| KR | 20190125938 | A * | 11/2019 | A47L 11/2025 |
| KR | 20200013535 | | 2/2020 | |
| WO | WO2000025653 | | 5/2000 | |

OTHER PUBLICATIONS

CN_1176152_-_Translation (Year: 1998).*

Office Action in Chinese Appln. No. 202180025346.5, mailed on Mar. 26, 2024, 20 pages (with English translation).

Principles of Chemical Engineering, Wang (ed)., Jan. 31, 2012, p. 12-14 (with machine translated English summary).

International Search Report in International Appln. No. PCT/KR2021/003922, dated Jul. 20, 2021, 5 pages (with English translation).

Office Action in Australian Appln. No. 2021247958, mailed on Oct. 26, 2023, 8 pages.

Office Action in Chinese Appln. No. 202180025346.5, mailed on Jul. 6, 2023, 22 pages (with English translation).

* cited by examiner

WET DUSTER MODULE FOR A CLEANER

CROSS-REFERENCE TO RELATED APPLICATIONS

This application is a National Stage application under 35 U.S.C. § 371 of International Application No. PCT/KR2021/003922, filed on Mar. 30, 2021, which claims the benefit of Korean Application No. 10-2020-0038162, filed on Mar. 30, 2020. The disclosures of the prior applications are incorporated by reference in their entirety.

TECHNICAL FIELD

The present disclosure relates to a wet duster module for a cleaner, more particularly, to a wet duster module for a cleaner for sucking or wiping dust or foreign matter in an area to be cleaned by discharging water to the duster.

BACKGROUND ART

A vacuum cleaner is a device that performs cleaning by sucking or wiping dust or foreign matter in an area to be cleaned.

Such a vacuum cleaner may be divided into a manual cleaner in which a user directly moves the cleaner to perform cleaning, and an automatic cleaner in which a user performs cleaning while driving by itself.

In addition, the manual cleaner may be classified into a canister-type cleaner, an upright-type cleaner, a handy-type cleaner, a stick-type cleaner, and the like, depending on a shape of the cleaner.

Such a cleaner may clean the floor using a cleaner head or a module. In general, a vacuum cleaner head or module may be used to suck air and dust. At this time, depending on a type of a head or module, a duster may be attached to clean the floor with the duster.

In addition, water may be discharged with a duster and a floor may be cleaned using a duster that has absorbed water.

Korean Patent Laid-Open No. 10-2019-0125917 (2019 Nov. 7) discloses a cleaner nozzle.

A conventional vacuum cleaner nozzle is provided with a water outlet for spraying water with a duster. At this time, the water outlet has a circular hole formed in the cylindrical body to discharge water. That is, the conventional outlet is formed without a height difference on the side wall or inner peripheral surface of the outlet.

However, in the case of the conventional water outlet as described above, there is a limitation in that the opening of the water outlet is blocked according to the difference in use environment and region because waterdrops are easily formed on the water outlet.

In other words, during use, dust or dirt may penetrate the outlet, cling to and block the outlet, and depending on regions, if using water containing compounds of calcium, the outlet may be clogged with the compounds of calcium in a state the waterdrops are condensed, as the waterdrops are dried up.

DISCLOSURE

Technical Problem

The present disclosure was created to improve the problems of the wet duster module of a conventional vacuum cleaner as described above, and an object of the present disclosure is to provide a wet duster module for a cleaner that prevents the water outlet from being clogged with foreign substances regardless of the use environment or area of use.

Technical Solution

One embodiment is a wet duster module for a cleaner including: a module housing having at least one or more suction flow paths through which air containing dust flows; a rotary cleaning unit disposed on a lower surface of the module housing, including at least one or more rotating plates to which a duster is coupled, and a driving motor for providing a rotational force to the rotating plate; and a water supply unit provided in the module housing and supplying water to the duster.

The water supply unit may include: a water tank mounted on the module housing and storing water supplied to the rotary cleaning unit; and a water supply nozzle for discharging water from the water tank to the duster.

The water supply nozzle may include: a nozzle body formed with a water supply path through which water introduced from the water tank flows and a water outlet for discharging water to the duster at one end thereof.

At one end of the nozzle body, an inclined surface may be formed at a predetermined angle with a water discharge direction so as to form the water outlet inclined.

The water supply nozzle may further include: a waterdrop guide wall extending along an axial direction from one end of the nozzle body to guide a flow of waterdrops formed on the water outlet.

The waterdrop guide wall may include: a guide surface formed in a shape of a surface forming a predetermined angle with the inclined surface and formed at a position forming a tangent line to an internal diameter of the water outlet.

The guide surface has an axial length formed to correspond to an axial height of the inclined surface.

The guide surface may include: a consecutive point connected to an inner peripheral surface of the water supply path.

The guide surface may be formed to have a height of one second or more and one fourth or less than a height in an axial direction from another end of the nozzle body to the consecutive point.

The guide surface may be formed to have a height of one third of a height in an axial direction from another end of the nozzle body to the consecutive point.

The water supply nozzle may further include a coupling frame coupled to the module housing to fix the nozzle body.

The water supply nozzle may further include a connection frame connecting the coupling frame and the nozzle body.

The module housing may include: a module base; and a module cover coupled to an upper side of the module base to form a space in which the water supply nozzle is accommodated.

The module cover may include: a cover body covering an upper side of the module base; and a first nozzle installation boss formed to protrude from an inner surface of the cover body toward the module base.

The coupling frame may include: a frame body formed outside the water supply nozzle; and a first mounting part formed at one end of the frame body and coupled to the first nozzle installation boss to fix the frame body.

The module cover may further include: a second nozzle installation boss formed to protrude at a predetermined distance from the first nozzle installation boss.

The coupling frame may further include: a second mounting part formed at another end of the frame body and coupled to the second nozzle installation boss to fix the frame body.

The first mounting part may include: a boss seating surface on which the first nozzle installation boss is seated; a boss receiving wall formed to protrude from the boss seating surface along a circumferential direction to receive the first nozzle installation boss therein; and a boss fastening hole formed in a form of a hole on the boss seating surface.

The second mounting part may include: a boss contact surface formed as a curved surface to be supported in contact with an outer peripheral surface of the second nozzle installation boss.

The second nozzle installation boss may include: a plurality of support ribs protruding outward from an outer peripheral surface thereof.

The second mounting part may further include: a boss support surface formed in a planar shape meeting the boss contact surface and contacted with the support rib.

The connection frame may include: a downward extension portion formed to extend in a direction in which water is discharged from the coupling frame; and a nozzle connecting portion formed by being bent and extending from the downward extension portion and connected to the nozzle body.

The water supply nozzle may further include: a water inlet formed in a hole shape at another end of the nozzle body in an axial direction to communicate with the water supply path, and through which water from the water tank is introduced.

The water supply path may be formed in a way a diameter thereof becomes narrower from the water inlet to the water outlet.

The water supply unit may further include: a water supply pipe connecting the water tank and the water supply nozzle and having a flow path for guiding water flowing from the water tank to the water supply nozzle.

The water supply nozzle may further include: a pipe supporting jaw formed to protrude from an outer circumferential surface of the nozzle body and inserted into the water supply pipe to support coupling with the water supply pipe.

The water outlet may be formed to be opened in an elliptical shape and have a height difference along an axial direction between both vertices in the opened long axis direction.

The inclined surface may be formed to be inclined at an angle of 15 degrees or more to 45 degrees or less to a central axis of the module body.

Advantageous Effect

As described above, according to the wet duster module for the cleaner according to the present disclosure, the water outlet is formed to be inclined to prevent waterdrops from forming while blocking the outlet, and there is an advantage of preventing the water outlet from being blocked as the waterdrops are dried up.

In addition, the guide wall is formed to extend at the end of the module so that waterdrops formed near the water outlet flow downward, thereby preventing the water outlet from being clogged.

MODE FOR INVENTION

Figure 1:
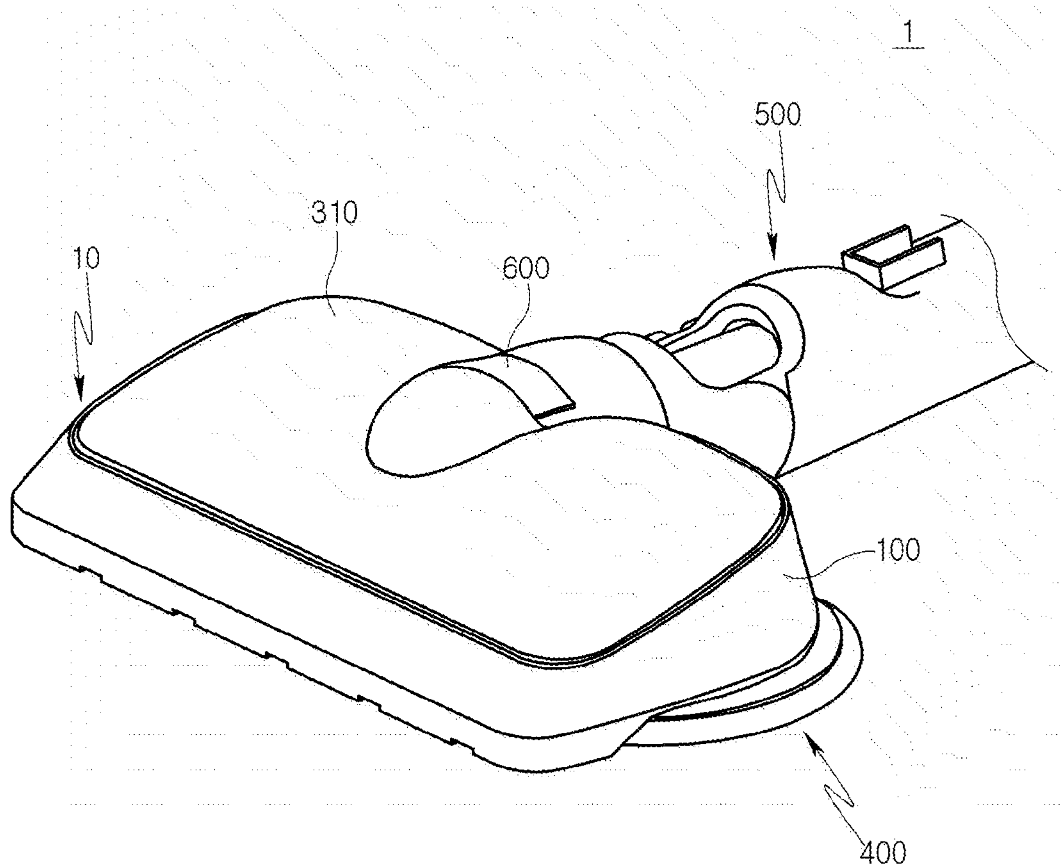
FIG. 1 is a perspective view of the wet duster module for the cleaner according to an embodiment of the present disclosure.

Hereinafter, exemplary embodiments of the present disclosure will be described in detail with reference to the accompanying drawings.

Since the present disclosure may have various changes and may have various embodiments, specific embodiments are illustrated in the drawings and will be described in detail in the Mode for Invention. This is not intended to limit the present disclosure to specific embodiments, and should be construed to include all modifications, equivalents, and substitutes included in the spirit and scope of the present disclosure.

Though terms such as ‘a first’, or ‘a second’ are used to describe various components, these components are not confined by these terms. These terms are merely used to distinguish one component from the other component. For example, without departing from the scope of the rights of various embodiments of the present invention, a first component may be referred to as a second component, and similarly, a second component may be referred to as a first component.

The term “and/or” includes any and all combinations of one or more of the associated listed items.

When an element (or an area, a layer, a part and the like) is ‘on’ another element, is ‘connected’ with, or is ‘coupled’ to another element, the element may be directly connected with or coupled to another element or a third intervening element may be disposed therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context.

In the present specification, it is to be understood that terms such as "including", "having", and the like are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the related art and will not be interpreted in an idealized or overly formal sense unless expressly so defined herein.

In addition, the exemplary embodiments are provided so that those skilled in the art may more completely understand embodiments of the present invention. Accordingly, shape, size, and the like of elements in the figures may be exaggerated for explicit comprehension.

Figure 2:
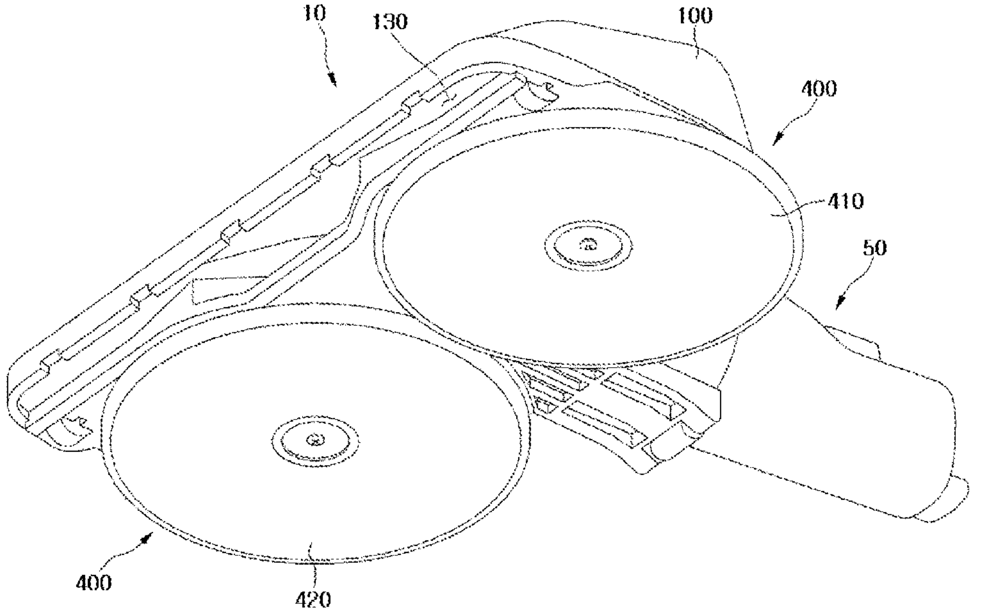
FIG. 2 is a perspective view of the wet duster module for the cleaner according to an embodiment of the present disclosure viewed from another direction.
Figure 3:
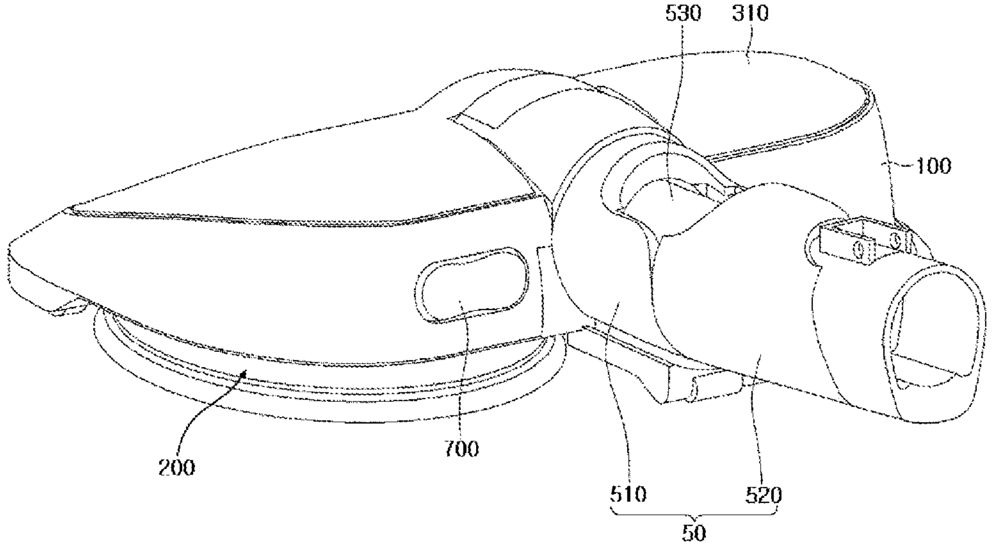
FIG. 3 is a perspective view of the wet duster module for the cleaner of FIG. 1 viewed from a rear side.
Figure 4:
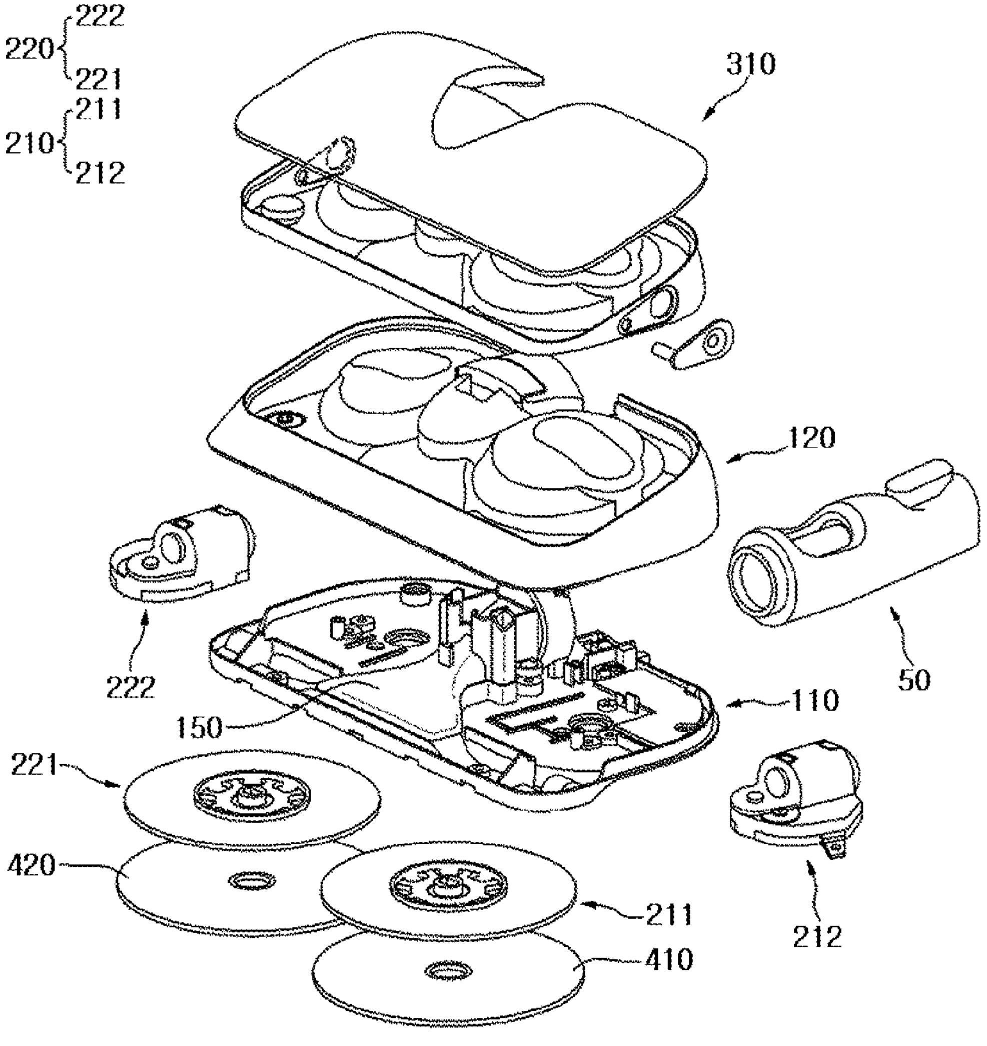
FIG. 4 is an exploded perspective view illustrating the wet duster module for the cleaner of FIG. 1.

FIGS. 1 and 2 are perspective views of the wet duster module for the cleaner according to an embodiment of the present disclosure. FIG. 3 is a perspective view of the wet duster module for the cleaner of FIG. 1 viewed from a rear side. FIG. 4 is an exploded perspective view illustrating the wet duster module for the cleaner of FIG. 1.

Referring to FIGS. 1 to 4, the wet duster module 1 of the cleaner according to the embodiment of the present invention (hereinafter referred to as "wet duster module") may include a module body 10 and a connection pipe 50 that is movably connected to the module body 10.

The wet duster module 1 of the present embodiment may be used, for example, by being connected to a handy-type cleaner or connected to a canister-type cleaner.

That is, the wet duster module 1 may be detachably connected to the cleaner or an extension tube of the cleaner. Accordingly, the user may clean the floor using the wet duster module 1 as the wet duster module 1 is connected to the cleaner or the extension pipe of the cleaner. At this time, the cleaner to which the wet duster module 1 is connected may separate dust in the air in a multi-cyclone method.

The wet duster module 1 may have its own battery to supply power to an internal power consumption unit, or to operate by receiving power from the cleaner.

Since the vacuum cleaner to which the wet duster module 1 is connected includes a suction motor (not illustrated), the suction force generated by the suction motor is applied to the wet duster module 1, and foreign substances on the floor and air may be sucked by the wet duster module 1.

Therefore, in the present embodiment, the wet duster module 1 may perform a role of sucking foreign substances on the floor and air and guiding the substances to the vacuum cleaner.

The connection pipe 50 is connected to a center portion of a rear side of the module body 10, and may guide the sucked air to the vacuum cleaner, but is not limited thereto.

If a direction of this embodiment is defined for better understanding, a part to which the connection pipe 50 is connected in the wet duster module 1 may be referred to as a rear side of the wet duster module 1, and an opposite part of the connection pipe 50 may be referred to as a front of the wet duster module 1.

The wet duster module 1 may further include a rotary cleaning unit 200 that is rotatably provided on a lower part of the module body 10.

For example, the rotary cleaning unit 200 may be provided as a pair and arranged in a left-right direction. At this time, the pair of rotary cleaning units 200 may be rotated independently. For example, the rotary cleaning unit 200 may include a first cleaning unit 210 and a second cleaning unit 220.

The rotary cleaning unit 200 may be combined with a duster 400. The duster 400 may be formed in a form of a disk, for example. The duster 400 may include a first duster 410 and a second duster 420.

The module body 10 may include a module housing 100 that forms an external shape. The module housing 100 may include suction flow paths 130 140 for sucking air.

The suction flow paths 130 140 may include a first path 130 extending in a left-right direction from the module housing 100, and a second path 140 communicating with the first path 130 and extending in a front-rear direction.

The first path 130 may be formed, for example, at a front end of a lower surface of the module housing 100.

The second path 140 may extend rearward from the first path 130. For example, the second path 140 may extend rearward from a center portion of the first path 130 toward the connection pipe 50.

In a state in which the rotary cleaning units 210 and 220 are connected to a lower part of the module body 10, a portion of the dusters 410 and 420 protrudes to an outside of the wet duster module 1 and thus, cleaning not only a floor surface located below the duster module 1, but also a floor surface located outside the wet duster module 1 is made possible.

For example, the dusters 410 and 420 may protrude not only toward both sides of the wet duster module 1 but also toward a rear side.

The rotary cleaning units 210 and 220 may be located, for example, on a rear side of the first path 130 in a lower part of the module body 10.

Therefore, when cleaning while moving the wet duster module 1 forward, the floor may be wiped with the dusters 410 and 420 after foreign substances on the floor and air are sucked by the first path 130.

In this embodiment, a first rotation center (C1) of the first rotary cleaning unit 210 (for example, a rotation center of a rotation plate 211) and a second rotation center (C2) of the second rotary cleaning unit 41 (for example, a rotation center of a rotation plate 221) are disposed to be spaced apart in left-right directions.

Figure 9:
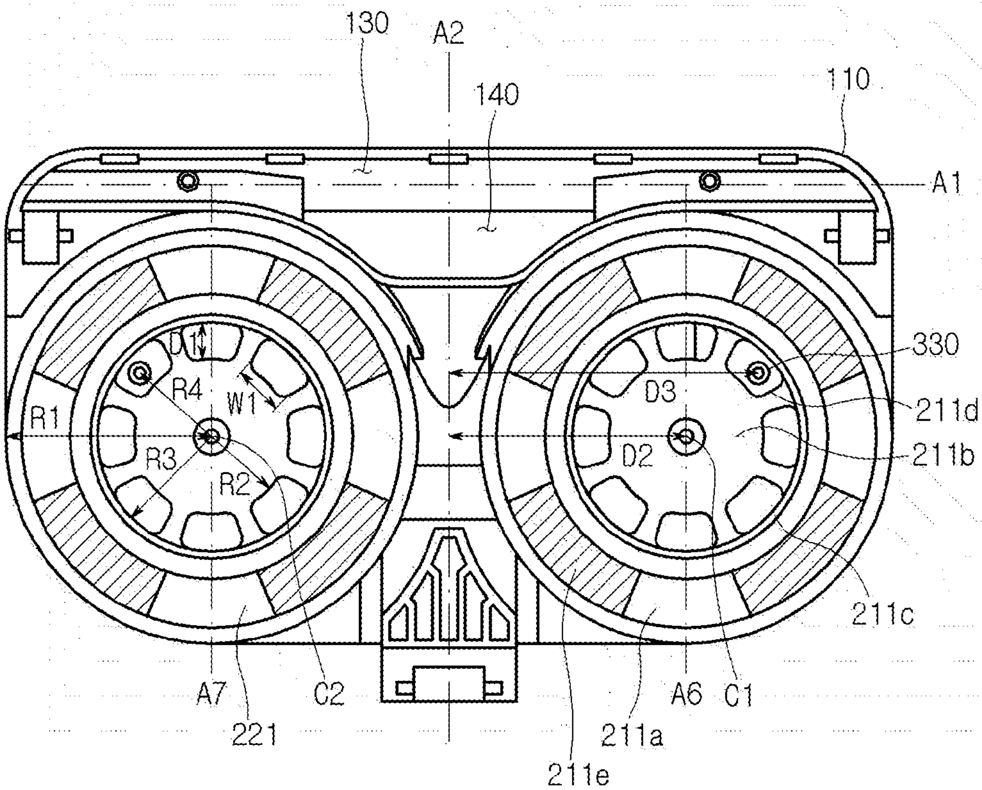
FIG. 9 is a view showing an arrangement of the rotating plate and the water supply nozzle according to an embodiment of the present disclosure.

A center line (A2) of the second path 140 may be positioned in a region between the first rotation center (C1) and the second rotation center (C2) (refer to FIG. 9).

The rotation centers C1 and C2 of the rotary cleaning units 210 and 220 may be located farther from a front end of the module body 10 than the central axis that bisects a front and rear length of the module body 10. This is to prevent the rotary cleaning units 210 and 220 from blocking the first path 130.

Therefore, a front and rear horizontal distance between the central axis (Y) and the rotation centers C1 and C2 of the rotary cleaning units 210 and 220 may be set to a value greater than zero.

In addition, a distance between the rotation centers C1 and C2 of the rotary cleaning units 210 and 220 may be formed larger than a diameter of the dusters 410 and 420. This is to reduce mutual friction caused by interference in the process of the dusters 410 and 420 being rotated, and to prevent an area that can be cleaned from being reduced as much as the interfered portion.

The module housing 100 may include a module base 110 and a module cover 120 coupled to an upper side of the module base 110.

The first path 130 may be formed in the module base 110. In addition, the module housing 100 may further include a flow path forming part 150 that forms the second path 140 together with the module base 110.

The flow path forming part 150 may be coupled to an upper central portion of the module base 110, and an end thereof may be connected to the connection pipe 50.

Therefore, since the second path 140 may extend in a substantially straight line in a front and rear direction by the arrangement of the flow path forming part 150, a length of the second path 140 may be minimized, so that path loss in the wet duster module 1 may be minimized.

A front portion of the flow path forming part 150 may cover an upper side of the first path 130. The flow path forming part 150 may be disposed to be inclined upward from a front end toward a rear side.

Accordingly, a height of a front part of the flow path forming part 150 may be lower than a height of a rear side thereof.

According to the embodiment, since the height of the front part of the flow path forming part 150 is low, there is an advantage in that the height of the front part among an entire height of the wet duster module 1 may be reduced. The lower a height of the wet duster module 1, the higher the possibility of cleaning by being drawn into a narrow space under a furniture or chair.

The connection pipe 50 includes a first connection pipe 510 connected to an end of the flow path forming part 150, a second connection pipe 520 rotatably connected to the first connection pipe 510, and a guide pipe 530 for communicating the first connector 510 and the second connector 520.

A plurality of rollers for smooth movement of the wet duster module 1 may be provided under the module base 110.

For example, the first roller 160 and the second roller 170 may be positioned at a rear of the first flow path 130 in the module base 110. The first roller 160 and the second roller 170 may be disposed to be spaced apart in a left-right direction.

According to the embodiment, by disposing the first roller 160 and the second roller 170 behind the first flow path 130, it becomes possible to connect the first path 130 to a front end of the module base 110 as close as possible, thus an area that may be cleaned using the wet duster module 1 may be increased.

As a distance from a front end of the module base 110 to the first path 130 increases, an area on which suction force does not act in a front of the first path 130 increases during the cleaning process, so an area left uncleaned increases.

On the other hand, according to the embodiment, the distance from the front end of the module base 110 to the first path 130 may be minimized, thereby a cleanable area may be increased.

In addition, by disposing the first roller 160 and the second roller 170 behind the first path 130, the left and right length of the first path 130 may be maximized.

That is, a distance between both ends of the first path 130 and both end edges of the module base 110 may be minimized.

In the present embodiment, the first roller 160 may be located in a space between the first path 130 and the first duster 410. In addition, the second roller 170 may be positioned in a space between the first path 130 and the second duster 420.

The first roller 160 and the second roller 170 may be rotatably connected to shafts, respectively. The shafts may be fixed to a lower part of the module base 110 in a state in which the shafts are arranged to extend in a left-right direction.

A distance between the shaft and the front end of the module base 110 is longer than a minimum distance between the dusters 410 and 420 (or a rotating plate to be described later) and the front end of the module base 110.

For example, between the shaft of the first roller 160 and the shaft of the second roller 170, at least a portion of the rotary cleaning units 210 and 220 (duster and/or rotating plate) may be positioned.

According to this arrangement, the rotary cleaning units 210 and 220 may be positioned as close as possible to the first path 130, so that an area being cleaned by the rotary cleaning units 210 and 220 among the floor surfaces on which the wet duster module 1 is located may be increased, thereby the floor cleaning performance may be improved.

The rollers 160 and 170 may support the wet duster module 1 at three points, although not limited thereto. That is, the roller may further include a third roller 180 provided on the module base 110.

Further, the third roller 180 may be located at a rear of the dusters 410 and 420 to prevent interference with the dusters 410 and 420.

In a state in which the dusters 410 and 420 are placed on a floor, the dusters 410 and 420 are pressed to be in close contact with the floor, the frictional force between the dusters 410 and 420 and the floor increases. In the embodiment, since the plurality of rollers are coupled to the lower part of the module base 110, dusterility of the wet duster module 1 may be improved by the plurality of rollers.

Meanwhile, the module body 10 may further include a water tank 310 so as to supply water to the dusters 410 and 420.

The water tank 310 may be detachably connected to the module housing 100. In a state in which the water tank 310 is mounted on the module housing 100, water in the water tank 310 may be supplied to the dusters 410 and 420.

The water tank 310 may form an exterior of the wet duster module 1 in a state being mounted on the module housing 100.

Substantially an entire upper wall of the water tank 310 may form an exterior of a top surface of the wet duster module 1. Accordingly, a user may check that the water tank 310 is mounted or that the water tank 310 is separated from the module housing 100.

The module body 10 may further include a separation controller 600 that operates to detach the water tank 310 in a state the water tank 310 is mounted on the module housing 100.

In the embodiment, the separation controller 600 may be positioned above the second path 140, for example. For example, the separation controller 600 may be disposed to overlap the center line (A2) of the second path 140 in a vertical direction.

Accordingly, since the separation controller 600 is located in a center portion of the wet duster module 1, the user may easily recognize the separation controller 600 and operate the separation controller 600.

Meanwhile, the module body 10 may further include a water amount regulator 700 for adjusting an amount of water discharged from the water tank 310. For example, the water amount regulator 700 may be located at a rear side of the module housing 100.

The water amount regulator 700 may be operated by a user, and it is possible to operate that water may be discharged from the water tank 310 or that water may not be discharged, by the water amount regulator 700.

Alternatively, the amount of water discharged from the water tank 310 may be adjusted by the water amount regulator 700. For example, depending on an operation of the water amount regulator 700, water may be discharged from the water tank 310 by a first amount per unit time, or water may be discharged by a second amount greater than the first amount per unit time.

The water amount regulator 700 may be provided to pivot in a left-right direction on the module housing 10 or may be provided to pivot in a vertical direction according to embodiments.

For example, in a state in which the water amount regulator 700 is positioned in a neutral position as shown in FIG. 3, the water discharge amount is 0, and by pushing a left side of the water amount regulator 700 to make the water amount regulator 700 pivoted to the left, water may be discharged from the water tank 310 by the first amount per unit time.

In addition, by pushing a right side of the water amount regulator 700 to make the water amount regulator 700 be pivoted to the right, water may be discharged from the water tank 310 by the second amount per unit time.

Figure 5:
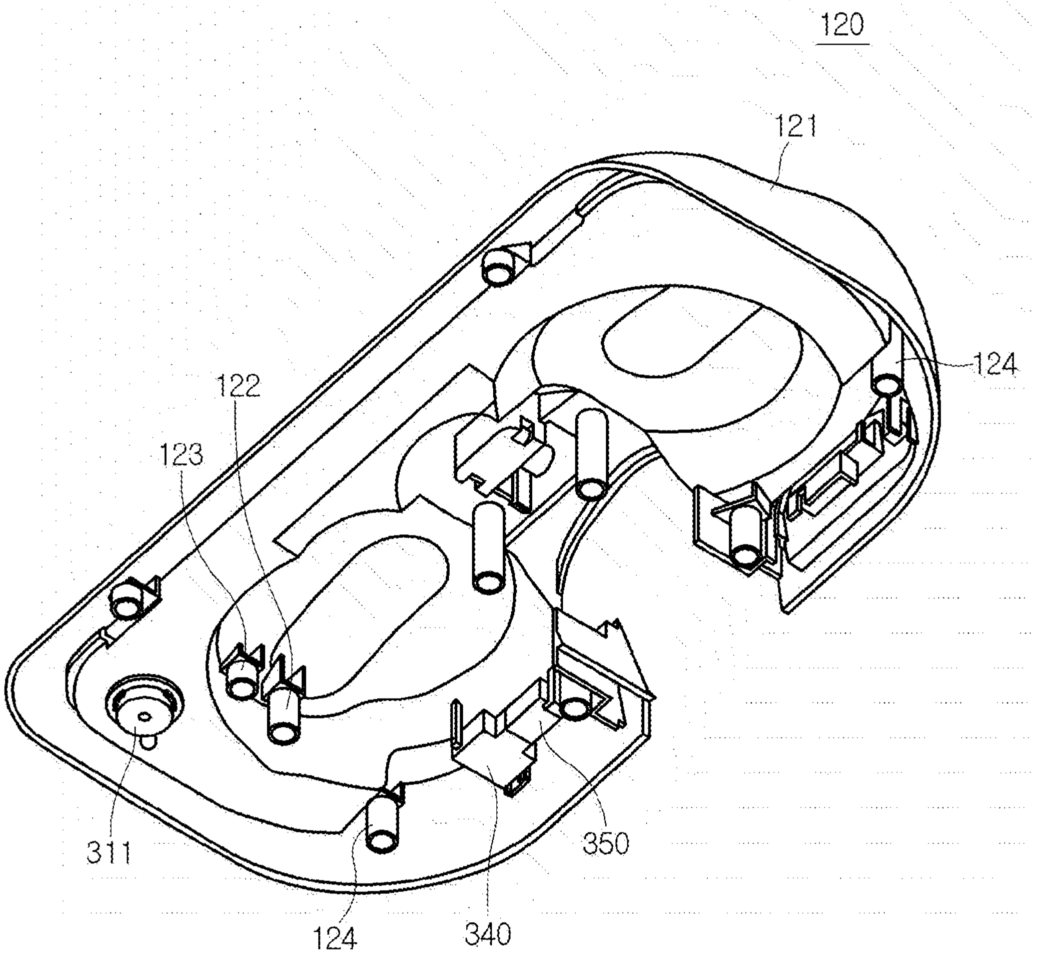
FIG. 5 is a perspective view for explaining a module cover in the wet duster module for the cleaner according to an embodiment of the present disclosure.
Figure 6:
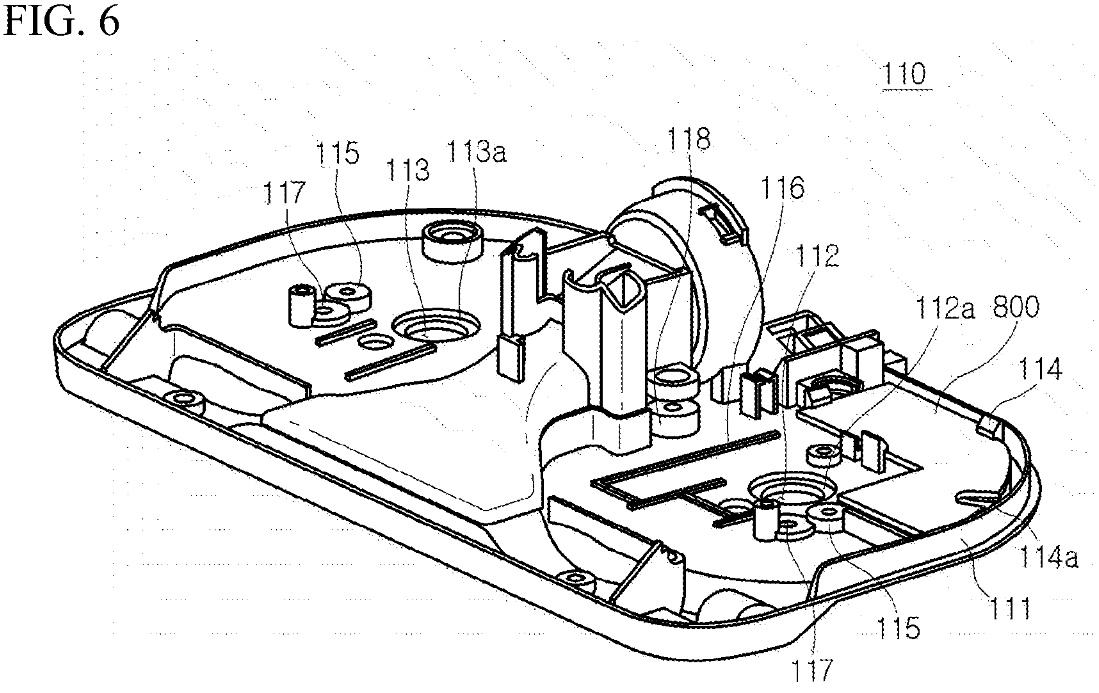
FIG. 6 is a perspective view illustrating a module base in the wet duster module for the cleaner according to an embodiment of the present disclosure.
Figure 7:
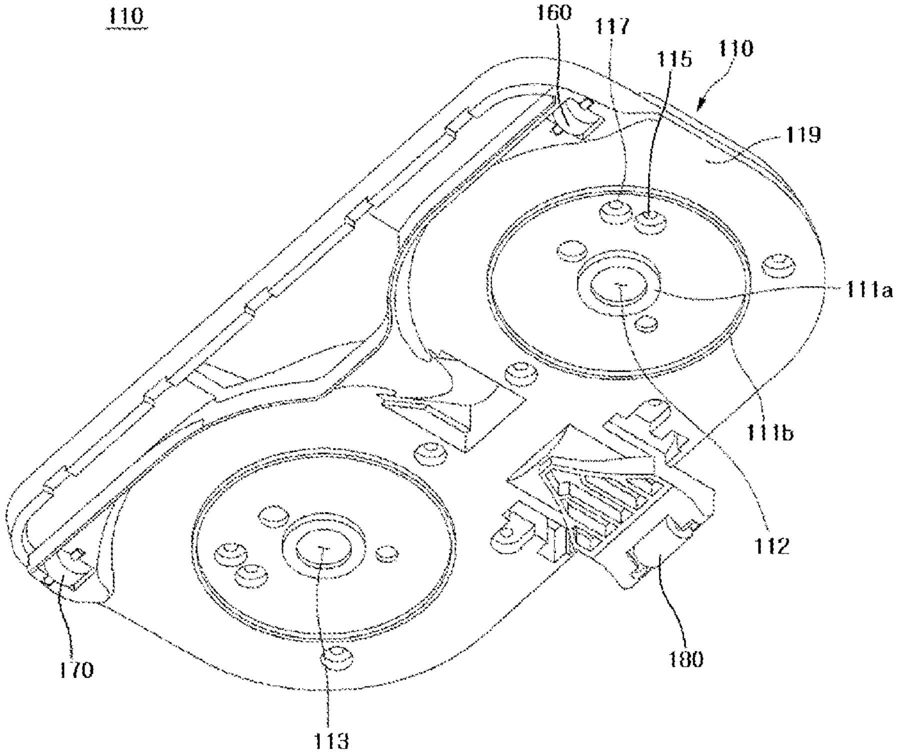
FIG. 7 is a perspective view of the module base viewed from another direction in the wet duster module for the cleaner according to an embodiment of the present disclosure.

Meanwhile, FIG. 5 is a perspective view for explaining a module cover in the wet duster module for the cleaner according to an embodiment of the present disclosure, FIG. 6 is a perspective view illustrating a module base in the wet duster module for the cleaner according to an embodiment of the present disclosure and FIG. 7 is a perspective view of the module base viewed from another direction in the wet duster module for the cleaner according to an embodiment of the present disclosure.

Referring to FIGS. 4 to 7, the module body 10 may further include a plurality of driving motors 212 and 222 for individually driving the rotary cleaning units 210 and 220.

Specifically, the driving motors 212 and 222 may include a first driving motor 212 for driving the first rotary cleaning unit 210 and a second driving motor 222 for driving the second rotary cleaning unit 220.

Since the driving motors 212 and 222 operate individually, even if some of the driving motors 212 and 222 fail, there is an advantage that rotation of some rotary cleaning units is possible by other driving devices.

The first driving motor 212 and the second driving motor 222 may be arranged to be spaced apart from each other in a left-right direction in the module body 10.

In addition, the driving motors 212 and 222 may be located at a rear of the first path 130.

For example, the second path 140 may be positioned between the first driving motor 212 and the second driving motor 222. In this case, the first driving motor 212 and the second driving motor 222 may be disposed to be symmetrical with respect to the center line (A2) of the second path 140.

Accordingly, even if the driving motors 212 and 222 are provided, the second path 140 is not affected, thereby a length of the second path 140 may be minimized.

According to the present embodiment, it is possible to prevent both sides of the second flow path 140 from being biased toward the first driving motor 212 and the second driving motor 222, respectively.

The driving motors 212 and 222 may be disposed in the module body 10. For example, the driving motors 212 and 222 may be seated on the upper side of the module base 110 and covered by the module cover 120.

That is, the driving motors 212 and 222 may be positioned between the module base 110 and the module cover 120.

The rotary cleaning units 210 and 220 may further include rotating plates 211 and 221 that are rotated by receiving power from the driving motors 212 and 222.

For example, the rotating plates 211 and 221 may include a first rotating plate 211 connected to the first driving motor 212 and to which the first duster 410 is attached, and a second rotating plate 221 connected to the second driving motor 222 and to which the second duster 420 is attached.

The rotating plates 211 and 221 may be formed in a disk shape, and the dusters 410 and 420 may be attached to a surface below the rotating plates 211 and 221.

Specifically, the rotating plates 211 and 221 have an outer body 211*a* in the form of a circular ring, and an inner body 211*b* located in the center region of the outer body 211*a* and spaced apart from an inner circumferential surface of the outer body 211*a* and a plurality of connection ribs 211*c* connecting an outer circumferential surface of the inner body 211*b* and the inner circumferential surface of the outer body 211*a* (refer to FIG. 9).

In addition, the rotating plates 211 and 221 are formed in the inner body 211*b*, and may include a plurality of water passage holes 211*d* formed along a circumferential direction to supply water discharged through a water supply unit 300 to the dusters 410 and 420.

Meanwhile, the rotating plates 211 and 221 may include a plurality of attachment means 211*e* formed on the outer body 211*a* along the circumferential direction and attaching the dusters 410 and 420 to the rotating plates 211 and 221. For example, the attachment means 211*e* may be Velcro.

The rotating plates 211 and 221 may be connected to the driving motors 212 and 222 below the module base 110. That is, the rotating plates 211 and 221 may be connected to the driving motors 212 and 222 from an outside of the module housing 100.

The module cover 120 covers an upper side of the module base 110 and includes a cover body 121 that forms an outer shape of the wet duster module 1 of the present invention.

Meanwhile, a tank connection part 311 through which a valve (not illustrated) in the water tank 310 may be operated and water may flow may be coupled to the module cover 120.

The tank connection part 311 may be coupled to a lower part of the module cover 120, and a part thereof may pass through the module cover 120 and protrude upward.

When the water tank 310 is seated on the module cover 120, the tank connection part 311 protruding upward may pass through an outlet of the water tank 310 and be introduced into the water tank 310.

A sealer may be provided on the module cover 120 to prevent water discharged from the water tank 310 from leaking around the tank connection part 311. The sealer may be formed of, for example, a rubber material, and may be coupled to the module cover 120 from an upper side of the module cover 120.

A water pump 340 for controlling discharge of water from the water tank 310 may be installed in the module cover 120. The water pump 340 may be connected to a pump motor 350.

The water pump 340 is a pump that expands or contracts while an internal valve body operates to communicate an inlet and an outlet, and may be implemented by a known structure, so a detailed description thereof will be omitted.

The valve body in the water pump 340 may be driven by the pump motor 350. Accordingly, according to the present embodiment, while the pump motor 350 is operating, the water from the water tank 310 may be continuously and stably supplied to the rotary cleaning units 210 and 220.

The operation of the pump motor 350 may be controlled by adjusting the above-described water amount regulator 700. For example, the on/off of the pump motor 350 may be selected by the water amount regulator 700.

Alternatively, an output (or rotational speed) of the pump motor 350 may be adjusted by the water amount regulator 700.

The module cover 120 may further include one or more fastening bosses 124 to be coupled to the module base 110.

In addition, a water supply nozzle 330 for discharging water to the rotary cleaning units 210 and 220 to be described later may be installed in the module cover 120. For example, the water supply nozzle 330 may be provided as a pair, and a pair of water supply nozzles 330 may be installed on the module cover 120 while being spaced apart from each other on a left and right side.

In the module cover 120, the nozzle installation bosses 122 and 123 for installing the water supply nozzle 330 may be provided. For example, the nozzle installation bosses 122 and 123 may be provided on both sides of the water supply nozzle 330, and may include a first nozzle installation boss 122 and a second nozzle installation boss 123.

Specifically, the first nozzle installation boss 122 may be formed to protrude from an inner surface of the cover body 121 toward the module base 110. For example, the first nozzle installation boss 122 may be formed in a hollow cylindrical shape and be fixedly coupled to the water supply nozzle 330 by a screw.

In addition, the second nozzle installation boss 123 may be formed to protrude at a predetermined distance from the first nozzle installation boss 122. For example, the second nozzle installation boss 123 may be formed at a symmetrical location to the first nozzle installation boss 122 with respect to the water supply nozzle 330.

Meanwhile, in the second nozzle installation boss 123, a plurality of support ribs **123*b* may protrude from an outer circumferential surface 123*a* toward an outside. For example, the second nozzle installation boss 123 may be formed in a hollow cylindrical shape. In addition, two support ribs 123*b* may be formed to protrude radially outward from the outer circumferential surface of the second nozzle installation boss 123 at a predetermined distance along an axial direction. For example, the support ribs 123*b* may be formed to protrude at an interval of 90 degrees with respect to an axial center of the second nozzle installation boss 123 (refer to FIG. 14**).

Accordingly, the water supply nozzle 330 may be coupled to and fixed to the first nozzle installation boss 122 and the second nozzle installation boss 123. As a result, when an external shock is applied or a pressure according to water discharge is applied, the water supply nozzle 330 may be prevented from being separated from the module housing 100 or from being shaken.

The module base 110 may include a base body 111 on which the rotary cleaning unit 200 is mounted, and forming an outer shape of the wet duster module 1 of the present invention.

In addition, the module base 110 may include a pair of shaft through-holes 112 and 113 through which a transmission shaft connected to each of the rotating plates 211 and 221 in the driving motor passes.

The module base 110 is provided with seating grooves **112*a* and 113*a* for seating sleeves provided in the drive motors 212 and 222, and the shaft through-holes 112 and 113 may be formed in the seating grooves 112*a* and 113*a***.

The seating grooves **112*a* and 113*a* are, for example, formed in a circular shape and may be formed by being depressed downwardly from the module base 110. In addition, the shaft through-holes 112 and 113 may be formed at a bottom of the seating grooves 112*a* and 113*a***.

As the sleeves provided in the driving motors 212 and 222 are seated in the seating grooves **112*a* and 113*a*, horizontal movement of the driving motors 212 and 222 may be restricted during travelling of the wet duster module 1 or operation of the driving motors 212 and 222**.

A protruding sleeve protruding downward is provided at a position corresponding to the seating grooves **112*a* and 113*a* on a bottom surface of the module base 110. The protruding sleeve is a portion formed while the bottom surface of the module base 110 protrudes downward as the seating grooves 112*a* and 113*a*** are substantially depressed downward.

In a state in which the path forming unit 150 is coupled to the module base 110, the shaft through-holes 112 and 113 may be disposed on both sides of the path forming unit 150.

The module base 110 may include a substrate installation unit 114 on which a control substrate 800 (or a first substrate) for controlling the driving motors 212 and 222 is installed. For example, the substrate installation part 114 may be formed in a form of a hook extending upward from the module base 110.

The hook of the substrate installation unit 114 is caught on an upper surface of the control substrate 800, thereby restricting upward movement of the control substrate 800.

The control substrate 800 may be installed in a horizontal state. In addition, the control substrate 800 is installed to be spaced apart from a bottom of the module base 110.

This is to prevent water from coming into contact with the control substrate 800 even if water falls to the bottom of the module base 110. To this end, the module base 110 may be provided with a support protrusion **114*a* for supporting the control substrate 800 to be spaced apart from the bottom of the module base 110**.

The substrate installation unit 114 may be located at one side of the path forming unit 150 in the module base 110, although not limited thereto. For example, the control substrate 800 may be disposed adjacent to the water amount regulator 700.

Accordingly, the switch installed on the control substrate 800 may detect operation of the water amount regulator 700.

The module base 110 may further include a motor support rib 116 for supporting bottoms of the driving motors 212 and 222.

The motor support rib 116 protrudes from the module base 110 and is bent one or more times, thereby separating the driving motors 212 and 222 from the bottom of the module base 110.

Alternatively, a plurality of motor support ribs 116 each spaced apart may protrude from the module base 110, thereby separating the driving motors 212 and 222 from the bottom of the module base 110.

Even if water falls to the bottom of the module base 110, the driving motors 212 and 222 are spaced apart from the bottom of the module base 110 by the motor support rib 116, thus, flowing of water toward the driving motors 212 and 222 may be minimized.

In addition, since the sleeves of the driving motors 212 and 222 are seated in the seating groove 116*a*, even if water falls to the bottom of the module base 110, entry of the water flowing into an interior of the driving motors 212 and 222 may be prevented by the sleeves.

In addition, the module base 110 may further include a nozzle hole 117 through which the water supply nozzle 330 passes.

A portion of the water supply nozzle 330 coupled to the module cover 120 may pass through the nozzle hole 117 when the module cover 120 is coupled to the module base 110.

In addition, the module base 110 may further include a path fastening boss 118 for fastening with the flow path forming part 150.

In a state in which the rotary cleaning units 210 and 220 are coupled to the bottom of the module base 110, a plate receiving part 119 recessed upward may be provided on a bottom surface of the module base 110 so that the first flow path 130 may become as close as possible to a floor surface on which the wet duster module 1 is placed.

In addition, height increase of the wet duster module 1 in a state in which the rotary cleaning units 210 and 220 are coupled to the wet duster module 1 by the plate receiving unit 119 may be minimized.

In a state in which the rotating plates 211 and 221 are positioned in the plate receiving part 119, the rotating plates 211 and 221 may be coupled to the driving motors 212 and 222.

The module base 110 may be provided with a bottom rib 111*b* disposed to surround the shaft through-holes 112 and 113. The bottom rib 111*b* may protrude downward from a lower surface of the plate receiving part 119, for example, and may be formed in a circular ring shape.

The shaft through-holes 116 and 118 and the nozzle hole 117 may be positioned in an area formed by the bottom rib 111*b*.

Figure 8:
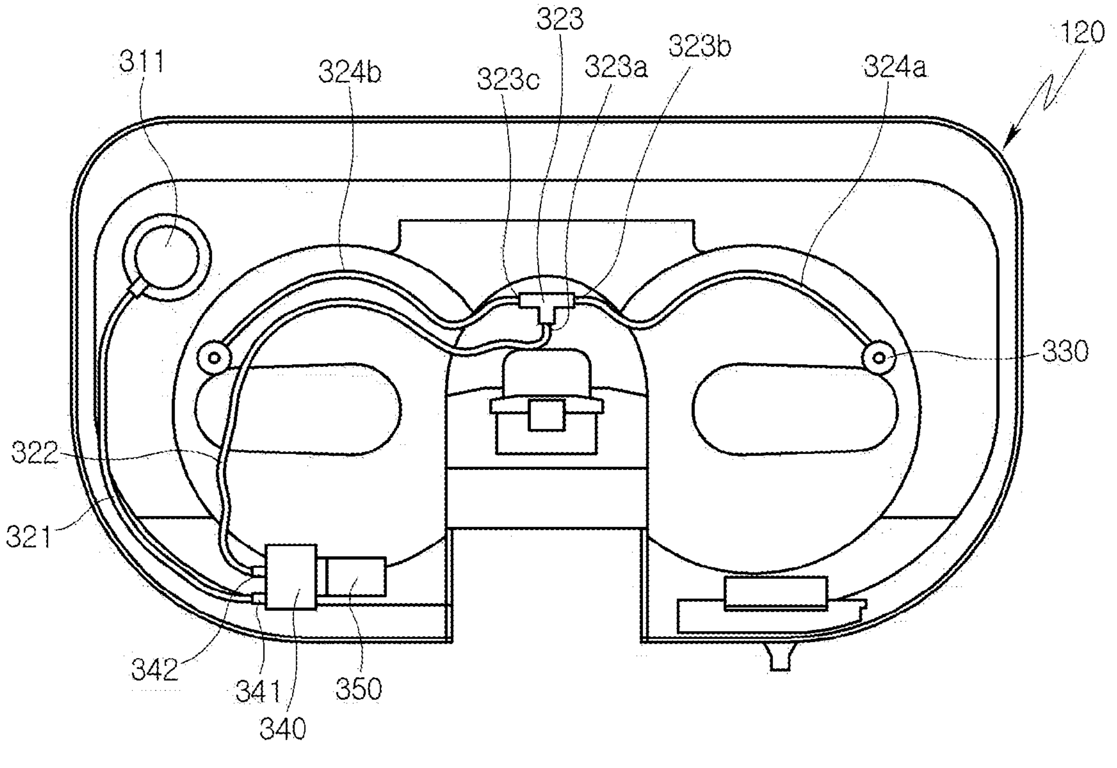
FIG. 8 is a view showing a water supply path for supplying water from a water tank to a rotary cleaning unit according to an embodiment of the present disclosure.
Figure 10:
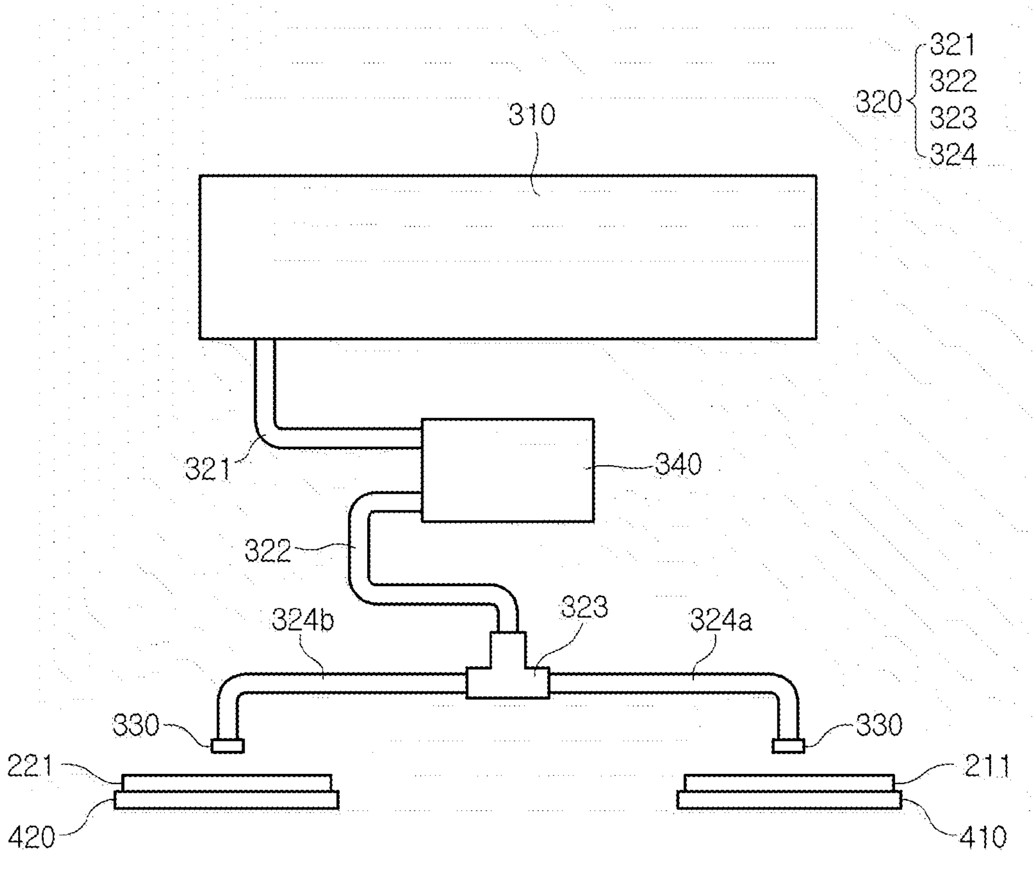
FIG. 10 is a conceptual diagram illustrating a process in which water is supplied from a water tank to a rotary cleaning unit according to an embodiment of the present disclosure.

FIG. 8 is a view showing a water supply path for supplying water from a water tank to a rotary cleaning unit according to an embodiment of the present disclosure, FIG. 9 is a view showing an arrangement of the rotating plate and the water supply nozzle according to an embodiment of the present disclosure, and FIG. 10 is a conceptual diagram illustrating a process in which water is supplied from a water tank to a rotary cleaning unit according to an embodiment of the present disclosure.

Referring to FIGS. 8 to 10, the wet duster module 1 of the present disclosure connects the water tank 310 and the water supply nozzle 330, and may further include a water supply pipe 320 in which a path guiding the water flowing from the water tank 310 to the water supply nozzle 330 is formed.

Specifically, the water supply pipe 320 may include a first water supply pipe 321 for supplying water from the water tank 310 to the water pump 340, a second water supply pipe 322 for supplying water from the water pump 340 to a connector 323 to be described later, and a third water supply pipe 324 for supplying water introduced into the connector 323 to the water supply nozzle 330.

The water pump 340 may include a first connection port 341 to which the first water supply pipe 321 is connected, and a second connection port 342 to which the second water supply pipe 322 is connected. With respect to the water pump 340, the first connection port 341 is an inlet, and the second connection port 342 is an outlet.

In addition, the water supply pipe 320 of the present disclosure may further include the connector 323 to which the second water supply pipe 322 is connected.

The connector 323 may be formed in a shape in which a first connection portion 323*a*, a second connection portion 323*b*, and a third connection portion 323*c* are arranged in a T-shape. The second water supply pipe 322 may be connected to the first connection portion 323*a*.

The third water supply pipe 324 may include a first branch pipe 324*a* connected to the second connection portion 323*b* and a second branch pipe 324*b* connected to the third connection portion 323*b*.

Accordingly, the water flowing through the first branch pipe 324*a* may be supplied to the first rotary cleaning unit 210, and the water flowing through the second branch pipe 324*b* may be supplied to the second rotary cleaning unit 220.

The first branch pipe 324*a* and the second branch pipe 324b may be connected to the water supply nozzle 330. The water supply nozzle 330 also forms a path for supplying water.

Accordingly, after water supplied to the first water supply pipe 321 is introduced into the water pump 340, the water flows into the second water supply pipe 322. The water flowing into the second water supply pipe 322 flows to the first branch pipe 324*a* and the second branch pipe 324*b* by the connector 323. In addition, the water flowing into the first branch pipe 324*a* and the second branch pipe 324*b* is discharged from the water supply nozzle 330 toward the rotary cleaning units 210 and 220.

The water sprayed from the water supply nozzle 330 is supplied to the dusters 410 and 420 after passing through the water passage holes 211*d* of the rotating plates 211 and 221. The floor is wiped while rotating in a state absorbing the water supplied to the dusters 410 and 420.

Figure 11:
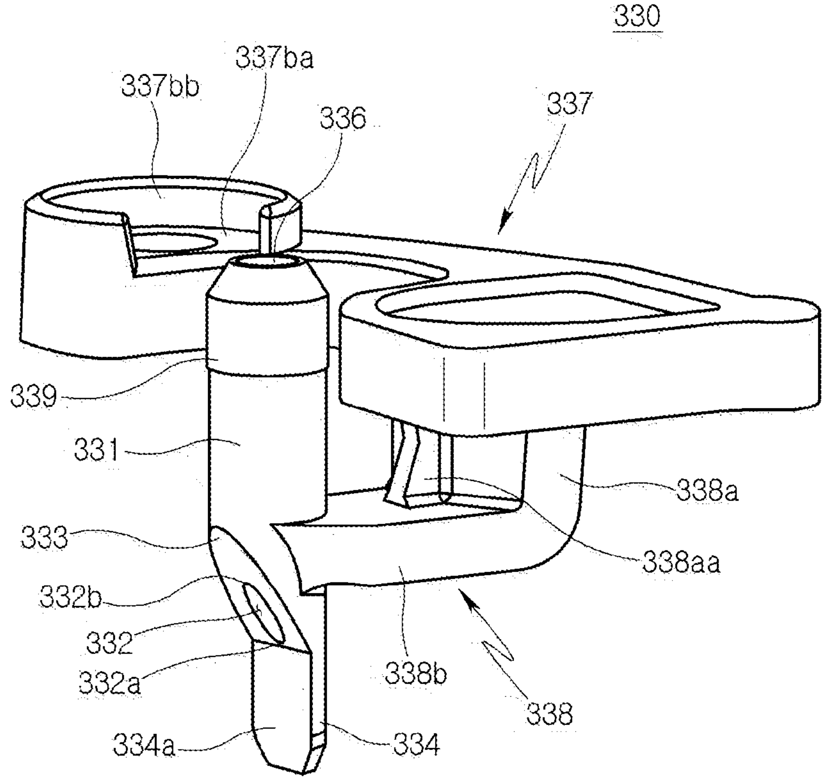
FIG. 11 is a perspective view illustrating a water supply nozzle according to an embodiment of the present disclosure.
Figure 12:
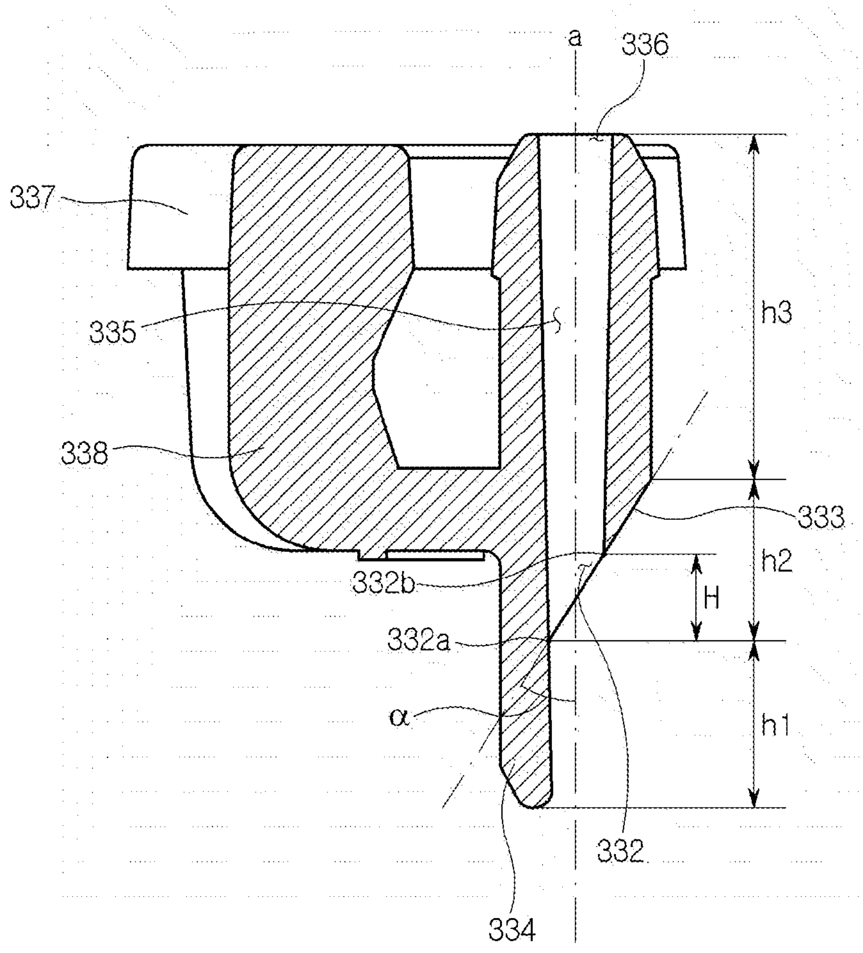
FIG. 12 is a cross-sectional view of FIG. 11.
Figure 13:
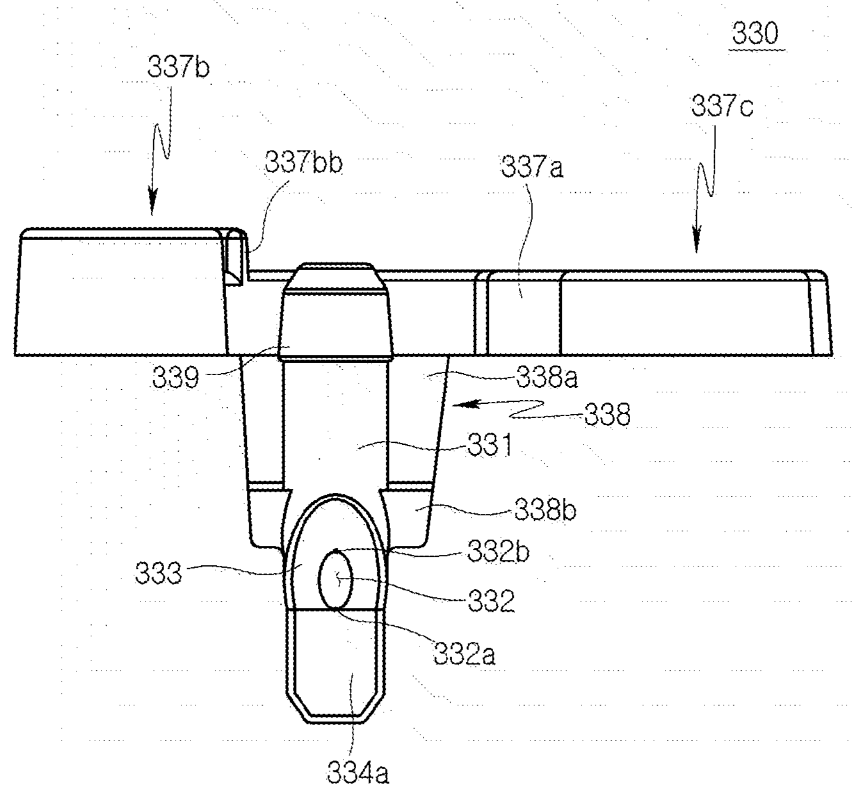
FIG. 13 is a front view for explaining a water supply nozzle according to an embodiment of the present disclosure.
Figure 14:
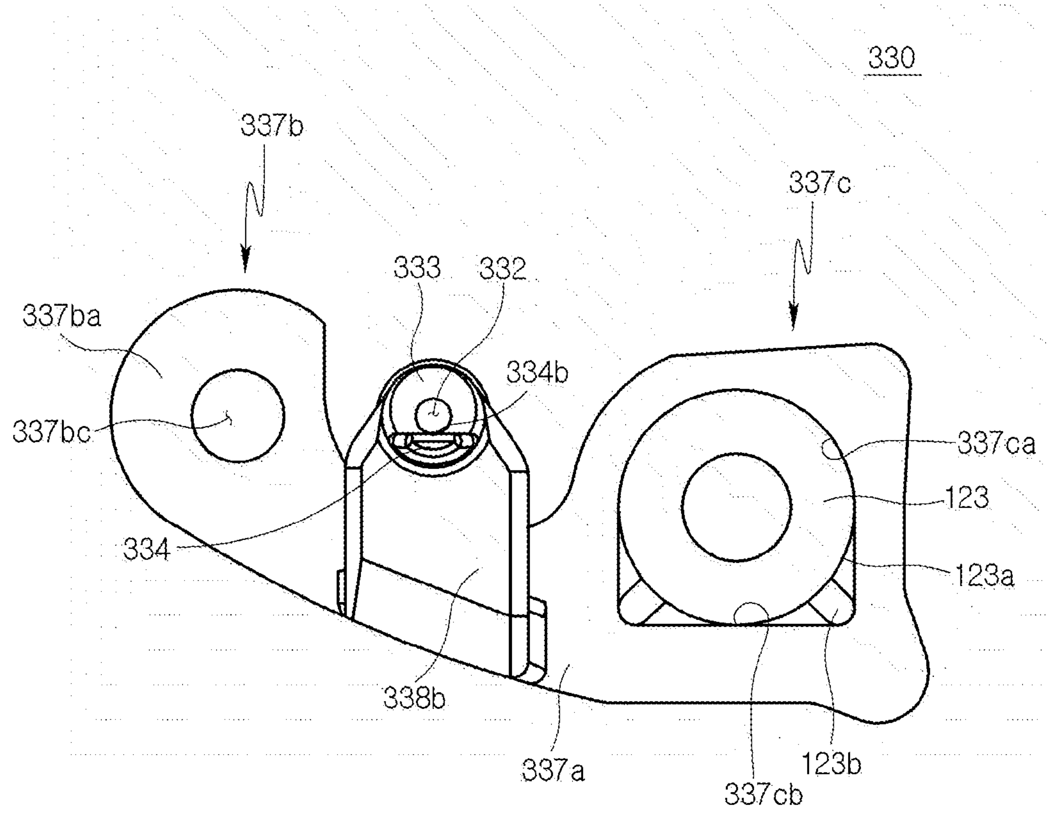
FIG. 14 is a bottom view for explaining a state in which the water supply nozzle is coupled to the module cover according to an embodiment of the present disclosure.

FIG. 11 is a perspective view illustrating a water supply nozzle according to an embodiment of the present disclosure, FIG. 12 is a cross-sectional view of FIG. 11, FIG. 13 is a front view for explaining a water supply nozzle according to an embodiment of the present disclosure, and FIG. 14 is a bottom view for explaining a state in which the water supply nozzle is coupled to the module cover according to an embodiment of the present disclosure.

Referring to FIGS. 5, 6, and 9 to 14, the water supply nozzle 330 of the present disclosure is configured to discharge the water from the water tank 310 to the dusters 410 and 420.

The water supply nozzle 330 may be mounted on the module cover 120 and be accommodated in a space formed inside the module cover 120.

For example, the water supply nozzles 330 may be mounted in a pair on the module housing 100 and arranged in a left-right direction. In addition, the pair of water supply nozzles 330 arranged in the left-right direction may be formed in a shape symmetrical to each other (reflection). Accordingly, in the present embodiment, description is based on the water supply nozzle 330 mounted on a left side, but the present disclosure is not limited thereto, and even a case in which the water supply nozzle 330 is formed symmetrically thereto is included in the present disclosure.

The water supply nozzle 330 may include a nozzle body 331 in which a water supply path 335 through which water introduced from the water tank 310 may flow is formed.

Specifically, the nozzle body 331 is formed in a hollow shape so that the water supply path 335 is formed therein, and at one end of the nozzle body 331 in an axial direction, a water outlet 332 for discharging water to the dusters 410 and 420 is formed, and a water inlet 336 through which water from the water tank 310 flows may be formed at the other end of the nozzle body 331 in the axial direction. At this time, the water supply path 335, the water outlet 332, and the water inlet 336 are formed to communicate with each other so as to form one flow path to supply the water introduced from the water tank 310 to the dusters 410 and 420.

For example, the nozzle body 331 may be formed in a cylindrical shape so that the water supply path 335 may be formed therein, and a diameter of the water supply path 335 may get narrower from the water inlet 336 to the water outlet 332. That is, the diameter of the water inlet 336 may be greater than a diameter of the water outlet 332.

Accordingly, flow velocity may be increased as water introduced into the water inlet 336 gradually passes through the narrow passage, and the present disclosure has an effect of preventing water from forming on the water outlet 332 thanks to such a structure.

Meanwhile, the nozzle body 331 extends downward through the nozzle hole 117. That is, the water outlet 332 is exposed to an outside of the module housing 100.

As such, when the water outlet 332 is positioned in the outside the module housing 100, water sprayed through the water outlet 332 may be prevented from being introduced into the module housing 100.

At this time, an upwardly recessed groove is formed in a bottom of the module base 110 to prevent the water outlet 332 exposed to the outside of the module housing 100 from being damaged, and the water outlet 332 may be positioned within the groove, with the water outlet 332 passing through the nozzle hole 117. That is, the nozzle hole 117 may be formed in the groove.

In addition, the water outlet 332 may be disposed to face the rotating plates 420 and 440 from the groove. The lower surface of the water outlet 332 may be located at the same height as the lower surface of the module base 110 or may be located higher.

Water sprayed from the water outlet 332 may pass through the water passage hole 211*d* of the rotating plates 211 and 221.

A minimum radius of the water passage hole 211*d* at a center of the rotation plates 211 and 221 is R2, and a maximum radius of the water passage hole 211*d* at the center of the rotation plates 211 and 221 is R3.

A radius from the center of the rotating plates 211 and 221 to a center of the water outlet 332 is R4. At this time, R4 is greater than R2 and smaller than R3.

In addition, D1, which is a difference between R3 and R2, is formed to be greater than a diameter of the water outlet 332.

Further, D1, which is the difference between R3 and R2, is formed to be smaller than a minimum width (W1) of the water passage hole 211*d*.

In addition, when external diameters of the rotating plates 211 and 221 are R1, R3 may be formed to be greater than a half of R1.

A line vertically connecting the first rotation center (C1) and a center line (A1) of the first path 130 may be referred to as a first connection line (A6), and a line vertically connecting the second rotation center (C2) and the center line (A1) of the first path 130 may be referred to as a second connection line (A7).

At this time, the first connection line (A6) and the second connection line (A7) are positioned in an area between the pair of water outlets 332 for supplying water to the rotary cleaning units 210 and 220.

That is, a horizontal distance (D3) between the water outlet 332 and the center line (A2) of the second path 114 is longer than the horizontal distance (D2) from the rotation centers C1 and C2 of each of the rotation plates 211 and 221 to the center line (A2) of the second path 114.

This is to prevent water flowing through the second path 114 from being suctioned into the wet duster module 1 in a rotation process of the rotating plates 211 and 221, since the second path 114 extends from a center portion of the wet duster module 1 in a front-rear direction.

A horizontal distance between the water outlet 332 and the center line (A1) of the first path 112 is shorter than a horizontal distance between the rotation centers C1 and C2 and the center line (A1) of the first path 112.

The water outlet 332 is located opposite to an axis line of the driving motors 212 and 222 with respect to the connection lines A6 and A7.

Meanwhile, when the nozzle body 331 is formed in a hollow shape as described above, waterdrops may form on an end of the nozzle body 331 in a water discharging direction. That is, when water pressure is no longer applied from the water pump 340 as the discharge of water is finished, water remaining in the water supply pipe 320 or the water supply nozzle 330 is formed on an end of the nozzle body 331 without falling to the ground or falling downward in a gravity direction due to adhesive force. At this time, when evaporation of water occurs in a state in which waterdrops are formed on an end of the nozzle body 331, the water outlet 332 may be blocked.

More specifically, dust or dirt generated during use penetrates and adheres to the waterdrops formed on the water outlet 332, thereby the water outlet may be blocked. Alternatively, when water containing compounds of calcium is used depending on an area of use, the water outlet 332 may be clogged with the compounds of calcium in a state the waterdrop is condensed, as the waterdrop dries up.

In order to solve this, at one end of the nozzle body 331 according to the embodiment of the present disclosure, an inclined surface 333 is formed at a predetermined angle ($\alpha$) with the water discharging direction so as to form the water outlet 332 to be inclined.

That is, the inclined surface 333 is formed in a shape similar to a cutting surface obtained by cutting the nozzle body 331 at a predetermined angle.

For example, the inclined surface 333 may be formed to be inclined at 15 degrees or more to 45 degrees or less with respect to a central axis (a) of the nozzle body 331 formed in a cylindrical shape.

The water outlet 332 is opened (formed) in an elliptical shape on the inclined surface 333.

Specifically, the water outlet 332 formed at one end of the nozzle body 331 is formed (opened) on the inclined surface 333. At this time, since the water outlet 332 communicates with the water supply path 335 formed in a circular hollow shape, its shape is similar to a cylinder cut obliquely. Accordingly, when viewed from an upper side perpendicular to the inclined surface 333, the water outlet 332 is formed in an elliptical shape.

In addition, the water outlet 332 is formed to be inclined at a predetermined angle (α) with respect to an axis (a) direction of the nozzle body 331.

For example, the water outlet 332 may be inclined at an angle of 15 degrees or more to 45 degrees or less to the central axis of the nozzle body 331 formed in a cylindrical shape.

Therefore, since the water outlet 332 is inclined with the central axis of the nozzle body 331 and is formed in an elliptical shape, there may be a height difference (H) between both vertices in a long axis direction of the water outlet 332 along an axial direction.

For example, the water outlet 232 may be formed in an elliptical shape, so that a first vertex 332*a* and a second vertex 332*b* may be formed at both vertices in the long axis direction of the ellipse. At this time, a height (h2+h3) from another axial end of the nozzle body 331 to the first vertex 332*a* may be formed higher than a height (h2+h3−H) from another axial end of the nozzle body 331 to the second vertex 332*b*.

Therefore, when waterdrops are formed in the water supply nozzle 330 after water is discharged from the water supply nozzle 330, the waterdrops flow downward along the inclined surface 333 due to gravity, and do not block the water outlet 232.

Moreover, when there is a height difference (H) between both vertices in the long axis direction of the water outlet 332, an area to which waterdrops may be attached becomes narrow. Accordingly, the waterdrops formed on the water outlet 332 do not form on the water outlet 332, but fall due to gravity.

Therefore, according to the present disclosure, it is possible to prevent the waterdrops from forming on the water outlet 332, and it is possible to prevent the water outlet 332 from being blocked by foreign substances dissolved in the waterdrops.

On the other hand, the water supply nozzle 330 of the present disclosure may further include a waterdrop guide wall 334 extending along the axial direction from one end of the nozzle body 331 in order to guide flow of waterdrops condensed on the water outlet 332.

The waterdrop guide wall 334 is formed as a surface forming a predetermined angle with the inclined surface 333, and may include a guide surface 334*a* formed at a position forming a tangent line with an inner wall of the water outlet 332.

For example, the guide surface 334*a* is formed similarly to a cross-sectional shape of the cylindrical nozzle body 331 cut along an axial direction.

In addition, the guide surface 334*a* may be connected to an inner peripheral surface of the water supply path 335 at one point. That is, the guide surface 334*a* and the water supply path 335 may contact with each other at the first vertex 332*a*. In addition, the guide surface 334*a* and the inner peripheral surface of the water supply path 335 may form a continuous line without being inflected at the first vertex 332*a* (thus the first vertex 332*a* may be referred to as a consecutive point 334*b*).

Meanwhile, the guide surface 334*a* may have an axial length corresponding to an axial height of the inclined surface 333.

For example, a height (h1: height of the guide surface 334*a*) from the consecutive point 334*b* to one end of the guide surface 334*a* in an axial direction (an end in a water discharging direction) and a height from the consecutive point 334*b* to another end of the inclined surface 333 in an axial direction (an end in a direction into which water is introduced) may be formed to have the same height (h2) (h1=h2).

In addition, a height from one end of the guide surface 334*a* in an axial direction to another end of the inclined surface 333 in an axial direction (h1+h2) may be formed to be equal to a height (h3) from another end of the nozzle body 331 to another end of the inclined surface 333 in an axial direction (h1+h2=h3).

In addition, the height (h1) of the guide surface 334*a* may be formed to be one second or more to one fourth or less than the axial height (h2+h3) from another end of the nozzle body 331 to the consecutive point 334*b*, and preferably, it may be formed to a height of one third of the axial height (h2+h3) from another end of the nozzle body 331 to the consecutive point 334*b*.

Therefore, according to the present disclosure, when the waterdrop is generated in the water supply nozzle 330, it flows downward in a direction of gravity along the guide surface 334*a* by gravity. Therefore, it is possible to prevent the waterdrops from forming on the water outlet 332, and it is possible to prevent the water outlet 332 from being clogged with foreign substances, as the waterdrops evaporate.

Meanwhile, the water supply nozzle 330 is formed to protrude from an outer circumferential surface of the nozzle body 331, and may further include a pipe supporting jaw 339 which is inserted into the water supply pipe 320 to support coupling with the water supply pipe 320.

For example, the pipe supporting jaw 339 may be located on another side of the nozzle body 331, may be formed to protrude outward in a radial direction from an outer circumferential surface of the nozzle body 331, and may be inserted into an inside of the third water supply pipe 324.

At this time, an end of the third water supply pipe 324 surrounds the outer circumferential surface of the nozzle body 331, and the end of the third water supply pipe 324 tightens the outer circumferential surface of the nozzle body 331 by elasticity of the third water supply pipe 324. In addition, the pipe supporting jaw 339 forms a step with the outer circumferential surface of the nozzle body 331, thereby preventing the end of the third water supply pipe 324 from being separated from the nozzle body 331.

The water supply nozzle 330 may further include a coupling frame 337 coupled to the module housing 100 to fix the nozzle body 331.

Specifically, the coupling frame 337 includes a frame body 337*a*, a first mounting part 337*b*, and a second mounting part 337*c*.

The frame body 337*a* is formed outside the nozzle body 331. For example, the frame body 337*a* may be formed in a form of an arc or a curved frame surrounding the outside of the nozzle body 331.

The first mounting part 337*b* may be formed at one end of the frame body 337*a* and may be coupled to the first nozzle installation boss 122 to fix the frame body 337*a*.

Specifically, the first mounting part 337*b* may include a boss seating surface 337*ba* on which the first nozzle installation boss 122 is seated, a boss receiving wall 337*bb* formed to protrude from the boss seating surface along a circumferential direction to receive the first nozzle installation boss therein, and a boss fastening hole 337*bc* formed in a form of a hole at a center of the boss seating surface 337*ba*.

Also, the first mounting part 337*b* may be disposed to a position corresponding to positions of the first nozzle installation boss 122 of the module cover 120 and the fastening hole 115 of the module base 110.

For example, the boss receiving wall **337*bb* may be formed to have an inner diameter corresponding to an outer diameter of the first nozzle installation boss 122, and the boss fastening hole 337*bc* may be formed to have a shape corresponding to the fastening hole 115**.

Accordingly, in order to couple the water supply nozzle 330 to the module housing 100, the first nozzle installation boss 122 may be seated on the first mounting part **337*b* and may be screw-coupled from a lower surface of the module base 110, through the fastening hole 115**.

Therefore, the module housing 100 and the water supply nozzle 330 may be firmly coupled by the first mounting part **337*b***.

The second mounting part **337*c* may be formed at another end of the frame body 337*a*, and may be coupled to the second nozzle installation boss 123 to fix the frame body 337*a***.

Specifically, the second mounting part **337*c* may include a boss contact surface 337*ca* formed as a curved surface so as to be in contact with and supported by the outer circumferential surface 123*a* of the second nozzle installation boss 123 and may include a boss support surface 337*cb* formed to have a planar shape meeting the boss contact surface 337*ca* and is in contact with the support rib 123*b***.

For example, the boss contact surface **337*ca* is formed in an arcuate shape to surround the outer circumferential surface 123*a* of the second nozzle installation boss 123, and the support rib 123*b* is fitted to the boss support surface 337*cb*** to be supported.

Accordingly, according to the second mounting part **337*c*, the second nozzle installation boss 123 may be inserted to fix the water supply nozzle 330. In particular, the boss support surface 337*cb* is formed on the second mounting part 337*c*, and the support rib 123*b* is fitted and the boss support surface 337*cb* is supported thereby, thus fixing force of the water supply nozzle 330** may be maintained without a separate fixing member such as a screw.

Therefore, according to the coupling frame 337, the first mounting part **337*a* and the second mounting part 337*b* fix both sides of the nozzle body 331, thereby preventing the nozzle body 331** from shaking or departing.

The water supply nozzle 330 may further include a connection frame 338 connecting the coupling frame 337 and the nozzle body 331.

The connection frame 338 may include a downward extension portion **338*a* and a nozzle connecting portion 338*b***.

The downward extension portion **338*a* may be formed to extend in a direction (lower side) in which water is discharged from the coupling frame 337. For example, the downward extension portion 338*a* may be formed to extend downwardly from a lower surface of the frame body 337*a* in a pillar shape having a predetermined thickness. In this case, on an outer surface of the downward extension portion 338*a*, a support pillar 338*aa* may further protrude toward the nozzle body 331 in order to improve the supporting force of the downward extension portion 338*a***.

The nozzle connecting portion **338*b* may be bent and extended from the downward extension portion 338*a* to be connected to the nozzle body 331. For example, the nozzle connecting portion 338*b* is bent and extended from a lower end of the downward extension portion 338*a*, and is formed to extend in parallel by a predetermined length toward the nozzle body 331, and as both ends thereof extending in parallel in a width direction are closing up, the nozzle connecting portion 338*b* may be connected to the outer circumferential surface of the nozzle body 331**.

Meanwhile, although not limited thereto, the nozzle connecting portion **338*b* may be connected to a position equal to or less than a half (lower side) of the nozzle body 331. This structure has an effect of reducing shaking of the nozzle body 331**.

Figure 15:
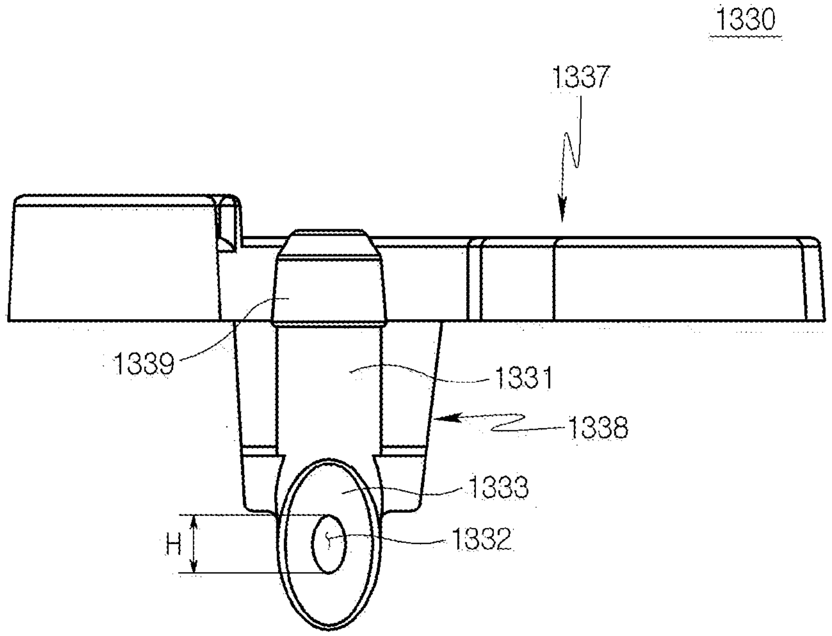
FIG. 15 is a side view for explaining a water supply nozzle according to another embodiment of the present disclosure.

On the other hand, FIG. 15 is a side view for explaining a water supply nozzle according to another embodiment of the present disclosure.

Except the parts specifically mentioned, a water supply nozzle 1330 of this embodiment has the same structure and effect as the water supply nozzle 330 according to the embodiment of the present disclosure, so the water supply nozzle 330 may be referred to.

At one end of the nozzle body 1331 according to the present embodiment, an inclined surface 1333 is formed at a predetermined angle with the water discharging direction so as to form the water outlet 1332 inclined.

That is, the inclined surface 1333 is formed in a shape similar to a cutting surface obtained by cutting the nozzle body 1331 at a predetermined angle.

As an example, the inclined surface 1333 may be an elliptical plane formed by being inclined at 15 degrees or more to 45 degrees or less with respect to the central axis of the nozzle body 1331 formed in a cylindrical shape.

The water outlet 1332 is opened (formed) in an elliptical shape on the inclined surface 1333.

Specifically, the water outlet 1332 formed at one end of the nozzle body 1331 is formed (opened) on the inclined surface 1333.

In addition, the water outlet 1332 is formed to be inclined at a predetermined angle with respect to an axial direction of the nozzle body 1331.

For example, the water outlet 1332 may be inclined at an angle of 15 degrees or more to 45 degrees or less to the central axis of the nozzle body 1331 formed in a cylindrical shape.

Accordingly, since the water outlet 1332 is inclined with the central axis of the nozzle body 1331 to form an elliptical shape, a height difference may occur between vertices of both sides of the water outlet 1332 in a long axis direction along the axial direction.

Therefore, when waterdrops are generated in the water supply nozzle 1330 after water is discharged from the water supply nozzle 1330, the waterdrops flow downward along the inclined surface 1333 due to gravity, and do not block the water outlet 1332.

Moreover, when there is a height difference (H) between the vertices of both sides of the long axis direction of the water outlet 1332, an area to which the waterdrops may be attached becomes narrow. Accordingly, the waterdrops generated on the water outlet 1332 do not form on the water outlet 1332 but fall due to gravity.

Therefore, according to the present disclosure, without a separate structure for guiding the waterdrop flow, it is possible to prevent waterdrops from forming on the water outlet 1332, and to prevent the water outlet 1332 from being clogged by foreign substances dissolved in the waterdrop.

On the other hand, in this embodiment, a coupling frame 1337 and a connection frame 1338 and a pipe supporting jaw 1339 have the same structure and effect as the coupling frame 337, the connection frame 338 and the pipe supporting jaw 339 according to the embodiment of the present disclosure, therefore, the description thereof may be referred to.

Although the present disclosure has been described in detail through specific embodiments, it is intended to describe the present disclosure in detail, and the present disclosure is not limited thereto. Further, it will be apparent to those skilled in the art that various modifications can be made to the above-described exemplary embodiments of the present disclosure without departing from the spirit or scope of the invention.

All of the simple modifications or changes of the present invention belong to the scope of the present invention, and the specific scope of the present invention may be apparent by the accompanying claims.

What is claimed is:

1. A wet duster module for a cleaner comprising:

a module housing that defines at least one or more suction flow paths configured to carry air containing dust;

a rotary cleaning unit disposed on a lower surface of the module housing, the rotary cleaning unit comprising (i) at least one or more rotating plates configured to couple to a duster and (ii) a driving motor configured to provide rotational force to the at least one or more rotating plates; and a water supply unit provided in the module housing and configured to supply water to the duster, wherein the water supply unit comprises:

a water tank mounted on the module housing and configured to store water supplied to the rotary cleaning unit, and a water supply nozzle configured to discharge water from the water tank to the duster, wherein the water supply nozzle comprises a nozzle body that defines (i) a water supply path configured to carry water introduced from the water tank and (ii) a water outlet provided at an end of the water supply path and configured to discharge water to the duster, wherein the water supply path extends parallel to an axial direction of a rotation axis of the at least one or more rotating plates, wherein the nozzle body has an inclined surface that is disposed at the end of the water supply path, that is inclined with respect to the axial direction by a predetermined angle, and that defines the water outlet in an elliptical shape, wherein the water outlet has a first vertex and a second vertex in a long axis direction of the elliptical shape and provides a height difference along the axial direction between the first vertex and the second vertex wherein the nozzle body is configured to, based on operation of the water supply unit being stopped, guide waterdrops at the water outlet to fall along the inclined surface, and wherein the water supply nozzle further comprises a waterdrop guide wall extending along the axial direction from one end of the nozzle body to guide a flow of waterdrops formed on the water outlet away from the nozzle body.

2. The wet duster module of claim 1, wherein the waterdrop guide wall comprises:

a guide surface that defines a predetermined angle with respect to the inclined surface and that defines a tangent line of the water outlet.

3. The wet duster module of claim 2, wherein the guide surface has an axial length that is substantially a same as an axial height of the inclined surface.

4. The wet duster module of claim 2, wherein the guide surface comprises:

a region that is contiguous with an inner peripheral surface of the water supply path at the first vertex.

5. The wet duster module of claim 2, wherein the guide surface is formed to have a height of one third of a height that is defined in the axial direction from another end of the nozzle body to the first vertex.

6. The wet duster module of claim 1, wherein the water supply nozzle further comprises a coupling frame coupled to the module housing to fix the nozzle body to the module housing.

7. The wet duster module of claim 6, wherein the water supply nozzle further comprises a connection frame connecting the coupling frame and the nozzle body.

8. The wet duster module of claim 6, wherein the module housing comprises:

a module base; and a module cover coupled to an upper side of the module base to form a space in which the water supply nozzle is accommodated, wherein the module cover comprises:

a cover body that covers the upper side of the module base, and a first nozzle installation boss that protrudes from an inner surface of the cover body toward the module base, and wherein the coupling frame comprises:

a frame body disposed outside of the water supply nozzle, and a first mounting part disposed at one end of the frame body and coupled to the first nozzle installation boss to fix the frame body to the module cover.

9. The wet duster module of claim 8, wherein the module cover further comprises:

a second nozzle installation boss that protrudes from the inner surface of the cover body toward the module base and that is spaced apart from the first nozzle installation boss by a predetermined distance, and wherein the coupling frame further comprises:

a second mounting part disposed at another end of the frame body and coupled to the second nozzle installation boss to fix the frame body to the module cover.

10. The wet duster module of claim 8, wherein the first mounting part comprises:

a boss seating surface on which the first nozzle installation boss is seated;

a boss receiving wall that protrudes from the boss seating surface along a circumferential direction to receive the first nozzle installation boss therein; and a boss fastening hole defined at the boss seating surface.

11. The wet duster module of claim 9, wherein the second mounting part comprises:

a boss contact surface formed as a curved surface to be supported in contact with an outer peripheral surface of the second nozzle installation boss.

12. The wet duster module of claim 11, wherein the second nozzle installation boss comprises:

a support rib protruding outward from the outer peripheral surface thereof, and wherein the second mounting part further comprises:

a boss support surface that has a planar shape, that is connected to the boss contact surface, and that contacts the support rib.

13. The wet duster module of claim 7, wherein the connection frame comprises:

a downward extension portion that extends in a direction in which water is discharged from the coupling frame; and a nozzle connecting portion that extends from the downward extension portion and that is connected to the nozzle body.

14. The wet duster module of claim 1, wherein the water supply nozzle further comprises:

a water inlet formed in a hole shape at another end of the nozzle body in the axial direction to communicate with the water supply path, and through which water from the water tank is introduced.

15. The wet duster module of claim 14, wherein an internal diameter of the water supply path becomes narrower from the water inlet to the water outlet.

16. The wet duster module of claim 1, wherein the water supply unit further comprises:

a water supply pipe connecting the water tank and the water supply nozzle and having a flow path for guiding water flowing from the water tank to the water supply nozzle.

17. The wet duster module of claim 16, wherein the water supply nozzle further comprises:

a pipe supporting barb that protrudes from an outer circumferential surface of the nozzle body and that is inserted into the water supply pipe to support coupling with the water supply pipe.

18. The wet duster module of claim 1, wherein the inclined surface is inclined by 15 to 45 degrees with respect to the axial direction.

* * * * *